May 7, 1935. A. L. SKINNER Re. 19,565

COUNTERBALANCE FOR WELL PUMPS

Original Filed Nov. 28, 1928 3 Sheets-Sheet 1

Inventor
Alva L. Skinner
by Edward A. Lawrence
his Attorney

May 7, 1935. A. L. SKINNER Re. 19,565

COUNTERBALANCE FOR WELL PUMPS

Original Filed Nov. 28, 1928 3 Sheets-Sheet 2

Inventor
Alva L. Skinner,
by Edward A. Lawrence
his Attorney

May 7, 1935. A. L. SKINNER Re. 19,565

COUNTERBALANCE FOR WELL PUMPS

Original Filed Nov. 28, 1928 3 Sheets-Sheet 3

Inventor
Alva L. Skinner,
by Edward A. Lawrence
his Attorney

Reissued May 7, 1935

Re. 19,565

UNITED STATES PATENT OFFICE 19,565

COUNTERBALANCE FOR WELL PUMPS

Alva L. Skinner, Bridgeport, Ill., assignor to the Ohio Oil Company, Findlay, Ohio, a corporation of Ohio Original No. 1,868,028, dated July 19, 1932, Serial No. 429,168, February 17, 1930, refiled for abandoned application Serial No. 322,467, November 28, 1928. Application for reissue July 14, 1934, Serial No. 735,270

16 Claims. (Cl. 74—591)

This invention relates to new and useful improvements in the power units of oil well pumping machines, and more particularly to means for counterbalancing the load end of the beam, the present application being an application for reissue of Letters Patent No. 1,868,028, issued July 19, 1932, on patent application Serial No. 429,168, filed February 17, 1930, which last mentioned patent application was a refiling of an application filed November 28, 1928, Serial No. 322,467. At present this counterbalancing is sometime accomplished by means of weights placed on the end of the beam opposite to that to which the rods are attached, while in other instances it is accomplished by means of weights adjustably mounted on the crank which operates the beam, and this present invention has to do with the latter type.

In machines where the counterbalanced weights are applied directly to the crank, these weights, usually two in number, are adjustably mounted on slideways associated with the crank, and are held in adjusted position by some clamping means, usually nuts and bolts, and are adjustable on straight lines towards and away from the drive shaft. The slideways, for the two weights, are usually arranged one above and the other below the crank, assuming the latter to be in a horizontal position.

The adjusting operation of the counterbalanced crank, of the type in present use, requires the stopping of the power unit in such position that the crank, with its slideways, will lie in an approximately horizontal position. The clamping bolts of the upper weight are then loosened and said weight is forced along its slide to the proper distance from the shaft, after which the bolts are again tightened. The power unit must then be started again and then stopped with the crank in proper position, so that the weight, then uppermost, may be adjusted in a similar manner. Thus, the power unit and the pump must be stopped twice for each adjustment of weights. Not only does this stopping of the pump cause the flow of oil to cease with a resultant loss, but there is then present the always-to-be-avoided danger of an accumulation of sand at the valves, necessitating the expensive operation of pulling the tubing, which causes a six to eight hour loss of oil flow. Furthermore, in devices of the type just described, there is danger of the clamping means becoming loose while the machine is in operation, thereby permitting the weights to thrash back and forth as the crank rotates, resulting in damage to the apparatus and, at times, injury to attendants.

It is, therefore, an object of the present invention to produce a counterbalanced crank, including a plurality of weights, whereby said weights may be simultaneously adjusted.

Another object is to produce a device of this character wherein all of the weights may be adjusted upon a single stopping of the power unit.

A further object is to produce a counterbalanced crank wherein accidental movement of the weights cannot take place during the operation of the crank.

Another object is to provide novel and improved means for accomplishing minute adjustments of the weights whereby to obtain accurate distribution of the weight of counterbalance in proportion to the load on the pump end of the beam.

Other objects and advantages will be apparent from the following description when taken in connection with the accompanying drawings.

Figure 1:
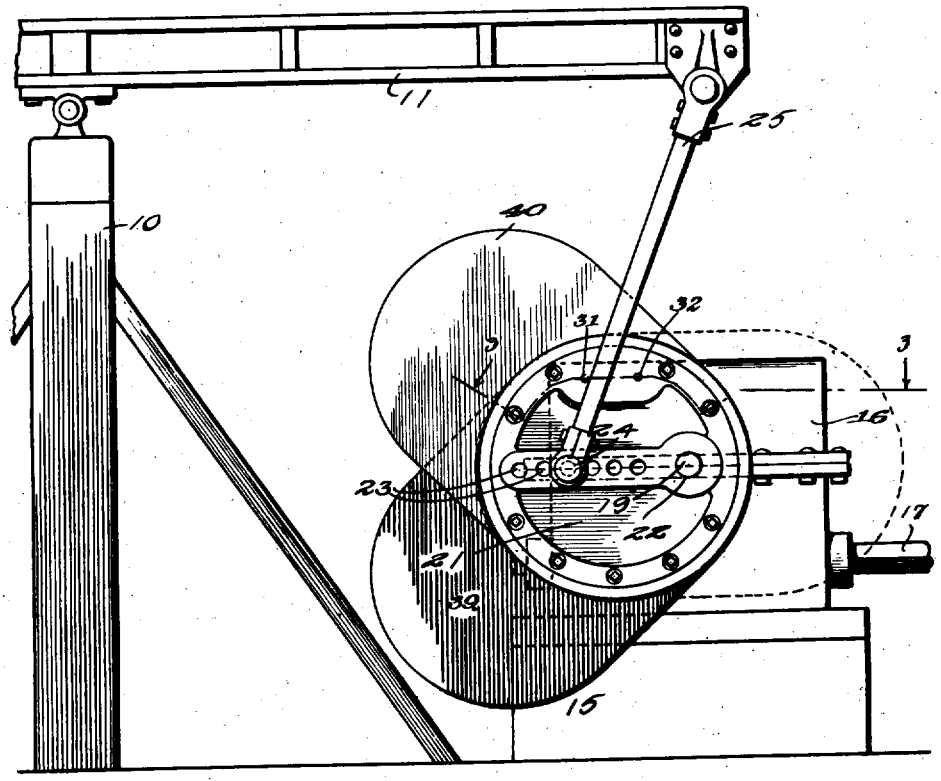
Figure 1 is an elevation of a portion of an oil well rig, showing a counterbalancing crank made in accordance with the present invention, the weights, as originally assembled, being shown in dotted lines.
Figure 2:
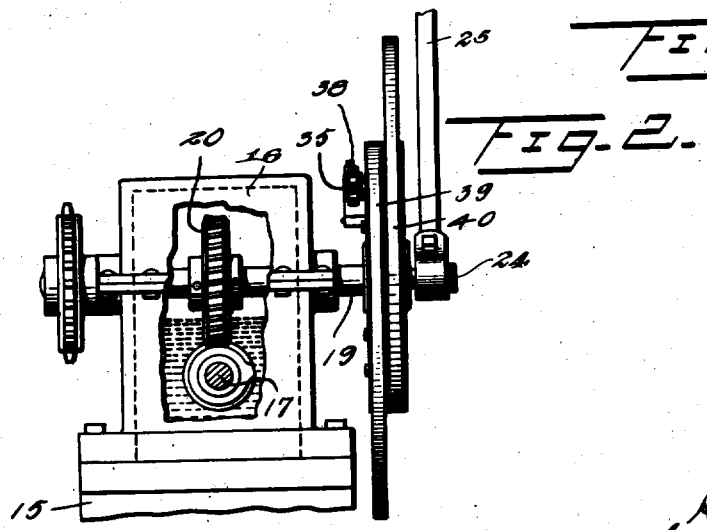
Figure 2 is an end view broken away.

Referring particularly to the accompanying drawings, 10 represents the Samson post of an oil well rig which pivotally supports the walking beam 11, to one end of which is connected the usual line of pump rods, not shown. Beneath the walking beam is a support 15 on which a housing 16 is mounted. Within the lower portion of the housing is a worm-shaft 17, which is driven by any suitable source of power. In the upper portion of the housing is a shaft 19 which extends at right angles to the worm-shaft and has fixed thereon, within the housing, a worm-wheel 20 which meshes with and is driven by said worm-shaft. Fixed on one end of the shaft 19, outside of the casing, is a crank 21 which is preferably in the form of a disk eccentrically connected to the shaft at an opening 22. Extending across the face of the disk from the opening 22, to its diametrically opposite side, is a series of openings 23, any one of which, according to the stroke desired, may receive a crank pin 24 to which the lower end of the pitman 25 is connected. This pitman has its upper end properly connected with the adjacent end of the walking beam, for operating the same.

Figures 3, 4:
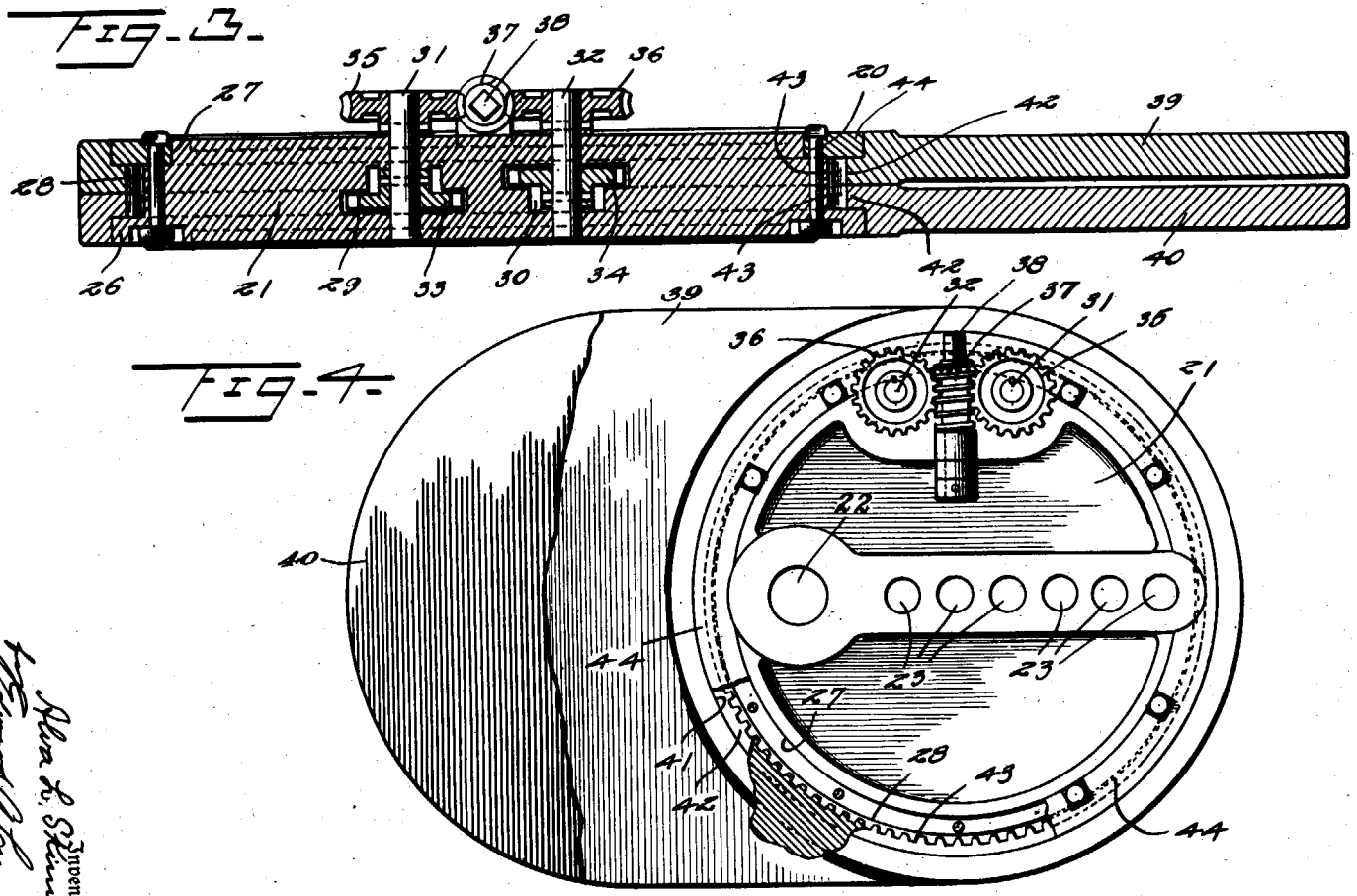
Figure 3 is a horizontal sectional view on the line 3—3 of Figure 1.
Figure 4 is an elevation of the reverse side of the counterbalancing device, a portion being broken away, and the weights being shown as originally assembled.

As shown in Figure 3, the periphery of the crank-disk 21 is formed with a flange 26, at one side, and a rabbet 27, at the other, resulting in a step 28. At a suitable point in the periphery of the disk are the recesses 29 and 30 which open through the step 28, and journaled in the walls of these recesses, so as to extend thereacross, are the shafts 31 and 32, on which spur-gears 33 and 34 are fixed, these gears being positioned within the recesses, excepting for a portion of each which extends outwardly through the step 28. It will be noted that they are offset, so that the teeth of one do not align with those of the other. One end of each of the shafts 31 and 32 protrudes beyond the face of the crank-disk and fixed upon these protruding ends are the worm-gears 35 and 36, between which and meshing with which is the worm-screw 37 having the angular head 38, by means of which it may be turned to simultaneously turn the gears 33 and 34 in opposite direction for a purpose which will be hereinafter described.

Figure 5:
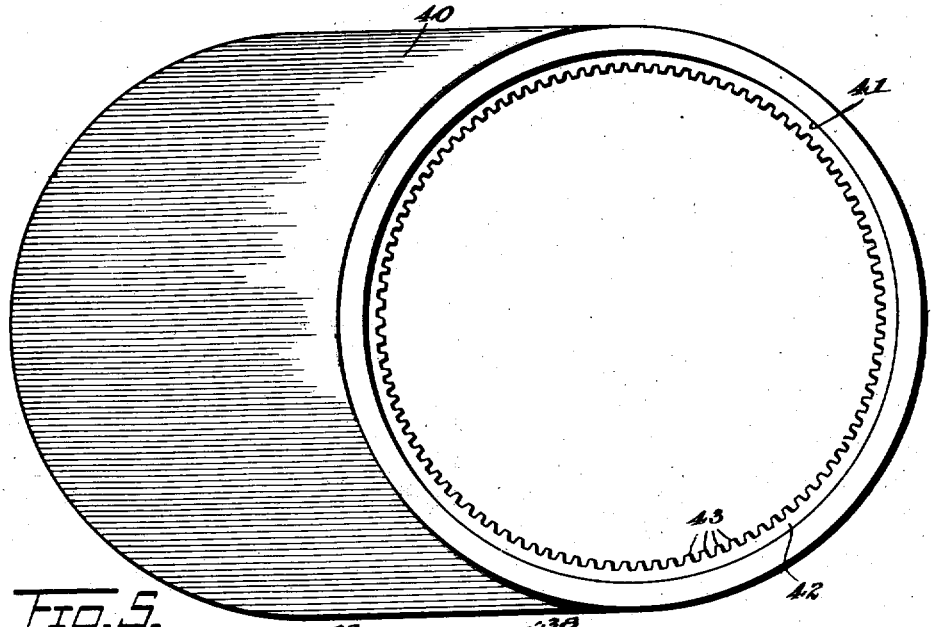
Figure 5 is a detail showing one of the counterbalance weights.
Figure 6:
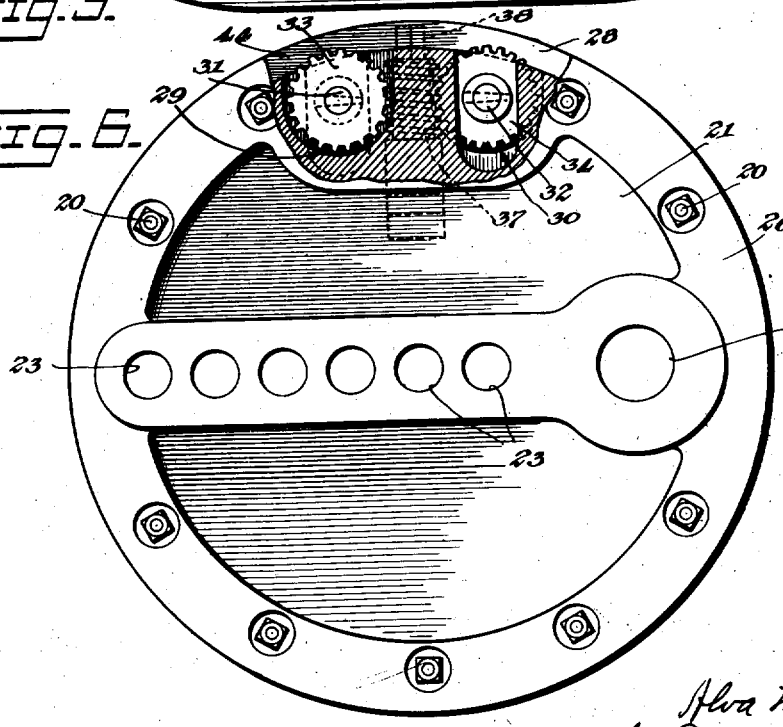
Figure 6 is a detail view showing the weight disk.

Mounted to rotate on the periphery of the crank-disk 21 are the counterbalance weights 39 and 40, which are identically constructed, one being illustrated in detail in Figure 5. Each of these weights, of which there are two in the present instance, consists of a substantially oval body, having at one end a circular opening 41, the wall of which is provided with an inwardly directed flange 42 having a series of gear teeth to form an internal ring-gear 43. The weights 39 and 40 are mounted so that their openings 41 receive the crank-disk 21, their ring-gears 43 being in contacting relation and each in mesh with one of the gears 33 and 34. They are movably held in position by the flange 26, at one side, and a retaining ring 44 at the other, this ring being secured by bolts passing therethrough and through the crank-disk 21. The weights are originally positioned so that their solid portions are in juxta-position and in alignment with a series of openings 23, but at the opposite side of the shaft 19, as shown in the dotted lines in Figure 1.

The operation of the device is as follows:

The counterbalance weights 39 and 40 are shown in dotted lines in Figure 1 to illustrate the position occupied when originally assembled. To obtain a proper adjustment, the mechanism is operated so as to bring the weights in a substantially vertical line above the shaft 19. The worm-screw is then turned, through the medium of a wrench on the head 38. This rotates the gears 35 and 36 in opposite directions and, correspondingly, the gears 33 and 34. As said gears are in mesh with the ring-gears of the weights, the latter may then gravitate to the desired positions, with respect to the crank-pin 24. The apparatus is then ready for operation and the pump may be started. Should there be any lost motion in the gearing by means of which the weights are controlled, the periphery of the crank disk may be so machined as to cause the retaining ring 44 to clamp the weights to a sufficient degree to prevent rattle.

From the foregoing it will be noted that a construction has been provided in which the counterbalance weights may be adjusted simultaneously and with ease, so that a minimum amount of time is required in that operation. It will also be noticed that, while the weights may be moved through the medium of the worm and gears, the arrangement of this gearing will prevent their accidental thrashing back and forth while the device is in operation. Again, owing to the facility with which such adjustments may be made, the time consumed by the pump remaining idle, is reduced to a minimum.

What is claimed is:

1. In a counterbalancing device for well pumping apparatuses, a shaft, an eccentric mounted on the shaft, counterbalance weight members rotatably supported on the eccentric, and means carried by the eccentric and operatively engaged with the weight members for simultaneously rotating the latter around the eccentric and means for operating said rotating means.

2. A counterbalancing device for well pumping apparatuses including a shaft, an eccentric mounted on the shaft, weight members rotatably supported on the eccentric, said weight members having ring-gears thereon, means on the eccentric engaged with the ring-gears for rotating the weight members around the eccentric, and means for operating the rotating means.

3. In a counterbalancing device for well pumping apparatuses the combination with a walking beam having pump rods and a pitman connected thereto, of a prime mover including a shaft having an eccentric connected to said pitman, a counterbalance weight mounted for rotation around the eccentric, means for rotating said weight to counterbalance said pump rods, and means for operating said rotating means.

4. A power unit for well pumping machines including a shaft, a crank disk connected to the shaft, gears carried by the crank disk and projecting through the margin thereof, counterbalance weights mounted on the crank disk in engagement with said gears, and means for rotating said gears to simultaneously adjust said weights, in opposite directions, around the crank disk.

5. A power unit for well pumping machines including a shaft, a crank disk connected to the shaft, counterbalance weights mounted on said crank disk for rotary adjustment therearound, means for adjusting said counterbalance weights, and a retaining ring for clamping said weights in their adjusted positions.

6. In a counterbalancing device for well pumping apparatuses, a shaft, an eccentric on the shaft, a plurality of weights mounted on the eccentric for movement in parallel planes, and means for simultaneously moving the weights in opposite directions.

7. In a counterbalancing device for well pumping apparatuses, a shaft, an eccentric mounted on the shaft, counterbalance weight members rotatably supported on the eccentric, and means carried by the eccentric and operatively engaged with the weight members for simultaneously rotating the latter around the eccentric.

8. A counterbalancing device for well pumping apparatuses including a shaft, an eccentric mounted on the shaft, weight members rotatably supported on the eccentric, said weight members having ring-gears thereon, and means on the eccentric engaged with the ring-gears for rotating the weight members around the eccentric.

9. In a counterbalancing device for well pumping apparatuses, a shaft, an eccentric mounted on the shaft, weight members rotatably supported on the eccentric, said weight members having ring-gears thereon, and gears carried by the eccentric for simultaneously rotating the weight members.

10. In a counterbalancing device for well pumping apparatuses, the combination with a walking-beam having pump rods and a pitman connected thereto, of a prime mover including a shaft having an eccentric connected to said pitman, a counterbalance weight mounted for rotation around the eccentric, and means for rotating said weight member to counterbalance said pump rods.

11. In a counterbalance for deep well pumping devices, a shaft, an eccentric on said shaft, a counterbalance weight mounted on the eccentric for rotation around the eccentric, means for rotating the weight entirely around the eccentric, and means for operating said rotating means.

12. In a counterbalancing device for well pumping apparatuses, a shaft, an eccentric on the shaft, counterbalance elements rotatably mounted on the eccentric, and means for simultaneously moving said elements toward each other around the shaft.

13. In a counterbalancing device for well pumping apparatuses, a shaft, an eccentric on the shaft, counterbalance weights movably mounted on the eccentric, means for simultaneously moving the weights around the eccentric, and means for operating said moving means.

14. In a counterbalancing device for well pumping apparatuses, a shaft, an eccentric mounted on the shaft, weight members rotatably supported on the eccentric, said weight members having ring gears thereon, gears carried by the eccentric and engaged with the ring gears for simultaneously rotating the weight members, and means for rotating the gears.

15. In a counterbalance device for well pumping apparatus, the combination with a rotary crank shaft, of a disk having a completely circular periphery eccentrically mounted on said shaft, weights movably mounted on the periphery of the disk, means for effecting a circumferential adjustment between the weights and the disk, and means for fixing the weights relative to the disk.

16. In a counterbalance device for well pumping apparatus, the combination with a rotary crank shaft, of a disk having a completely circular periphery eccentrically mounted on said shaft, weights movably mounted on the periphery of the disk, means for adjusting the weights circumferentially around the disk, and means for fixing the weights relative to the disk.

ALVA L. SKINNER.